United States Patent [19]

Anandan et al.

[11] Patent Number: 4,978,888
[45] Date of Patent: Dec. 18, 1990

[54] THICK-FILM INTEGRATED FLAT FLUORESCENT LAMP

[75] Inventors: Munisamy Anandan, Wayne; Douglas Ketchum, Rockaway, both of N.J.

[73] Assignee: Thomas Electronics Incorporated, Wayne, N.J.

[21] Appl. No.: 381,503

[22] Filed: Jul. 18, 1989

[51] Int. Cl.$^5$ ............................................. H01J 63/02
[52] U.S. Cl. .................................... 315/58; 313/493
[58] Field of Search ................ 315/58; 313/493, 581, 313/582, 584; 350/345

[56] References Cited

U.S. PATENT DOCUMENTS

| | | | |
|---|---|---|---|
| 3,858,284 | 1/1975 | Costa et al. | 313/584 |
| 4,060,749 | 11/1977 | Shinada et al. | 315/58 |
| 4,112,329 | 9/1978 | Veith | 313/493 |
| 4,780,644 | 10/1988 | Sakai et al. | 313/584 |
| 4,851,734 | 7/1989 | Hamai et al. | 313/493 |
| 4,920,298 | 4/1990 | Hinotani et al. | 313/493 |

OTHER PUBLICATIONS

K. Hinotani, S. Kishimoto, K. Terada, "Flat Fluorescent Lamp for LCD Back-Light", International Display Research Conference, 52-55, 1988.

*Primary Examiner*—Eugene R. LaRoche
*Assistant Examiner*—Son Dinh
*Attorney, Agent, or Firm*—Davis Hoxie Faithfull & Hapgood

[57] ABSTRACT

A thick-film integrated flat fluorescent lamp consists of a plurality of thick-film integrated split hollow electrodes printed on the inside of two opposing flat glass plates. These plates are sealed together, with a fixed space between them, which is filled with mercury and inert gas. Phosphor is coated on both glass plates and aluminum is preferably coated on one. The split hollow electrode structure produces more uniform brightness from the lamp over the entire area of the lamp, and results in a lamp of long life.

14 Claims, 3 Drawing Sheets

THICK-FILM INTEGRATED FLAT FLUORESCENT LAMP

BACKGROUND OF THE INVENTION

1. Field of Invention

The present invention relates generally to an integrated flat fluorescent lamp and a method of making such a lamp. The present invention relates more particularly to a flat fluorescent lamp having a plurality of thick-film electrodes arranged to form two conductive split hollow electrodes.

2. Description of the Prior Art

With the recent increase in the demand for small, portable video screens, such as in small screen portable televisions and laptop computers, the problem has arisen of constructing suitably light and uniformly bright flat display devices. One popular type of display, the liquid crystal display, depends on backlighting to improve the quality of the images displayed. One prior art backlight design used tubular fluorescent lamps. An improvement on this basic design placed a pair of electrodes on opposite ends of a lamp construction. See, K. Hinotani, S. Kishimoto, K. Terada, "Flat Fluorescent Lamp For LCD Back-Light", International Display Research Conference, 52–55, 1988. The Hinotani, et al., electrodes are of unitary construction and extend essentially the entire length of the lamp. While this construction emits light more uniformly than the tubular fluorescent lamp construction, it still has substantial nonuniformity.

SUMMARY OF THE INVENTION

It is an object of the present invention to provide a flat fluorescent lamp with a new arrangement of electrodes which will be more readily manufacturable and which will produce more uniform brightness over the viewing area of the lamp while providing electrodes with a geometry suitable for long device life.

A further object of the invention is to make the lamp more compact by enclosing the new arrangement of electrodes together with phosphor, inert gas and mercury between glass plates, hereinafter called substrates, separated by only a short distance.

According to the invention, there are provided two groups of thick-film conductors printed on the inside of a pair of substrates and electrically connected through conductively coated glass spacers, so as to form two groups of split hollow electrodes disposed on the opposite sides of the substrates. The substrates are then sealed together. The seal encloses two layers of phosphor, one on each substrate. In a preferred embodiment, an aluminum layer is deposited below the back phosphor layer. When a suitable amplitude and frequency of electric potential are applied to the electrodes, the inert gas and mercury which are sealed between the substrates pass an electric current and ultraviolet rays are given off by the mercury. The ultraviolet rays are converted into visible light by the phosphor layers. The magnitude of the current is limited by thick-film resistors electrically connected to the thick-film conductive electrodes from outside the seal. The seal further preserves the purity of the contents responsible for producing the ultraviolet rays and the conversion of these rays into visible light supplied by the flat fluorescent lamp.

DETAILED DESCRIPTION

Figure 1:
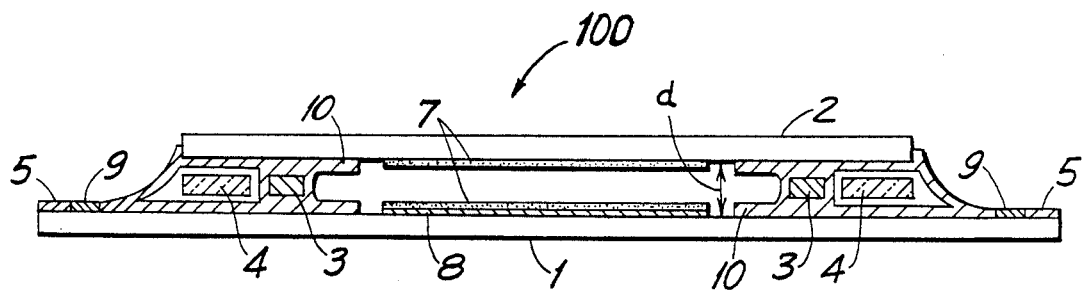
FIG. 1 is a sectional elevational view of an arrangement, with evacuation tubing omitted for clarity, of a thick-film integrated flat fluorescent lamp in accordance with the present invention.

FIG. 1 shows, in cross-section, the overall construction of a flat fluorescent lamp 100 according to the present invention. Lamp 100 has a flat bottom, or rear substrate 1 and a flat top, or front substrate 2. As seen in FIG. 1, substrate 1 is the bottom substrate and substrate 2 is the top substrate; however, in its typical operation, the lamp 100 will provide light through its front, substrate 2 for a purpose such as backlighting an LCD display of a laptop computer or a flat panel television. In such operation, rear substrate 1 faces the inside of the computer or television. Consequently, substrate 1 is preferably coated with a reflective layer 8, such as a vacuum deposited aluminum layer, to increase the lamp's efficiency by increasing the light provided out the front substrate 2.

Figure 2:
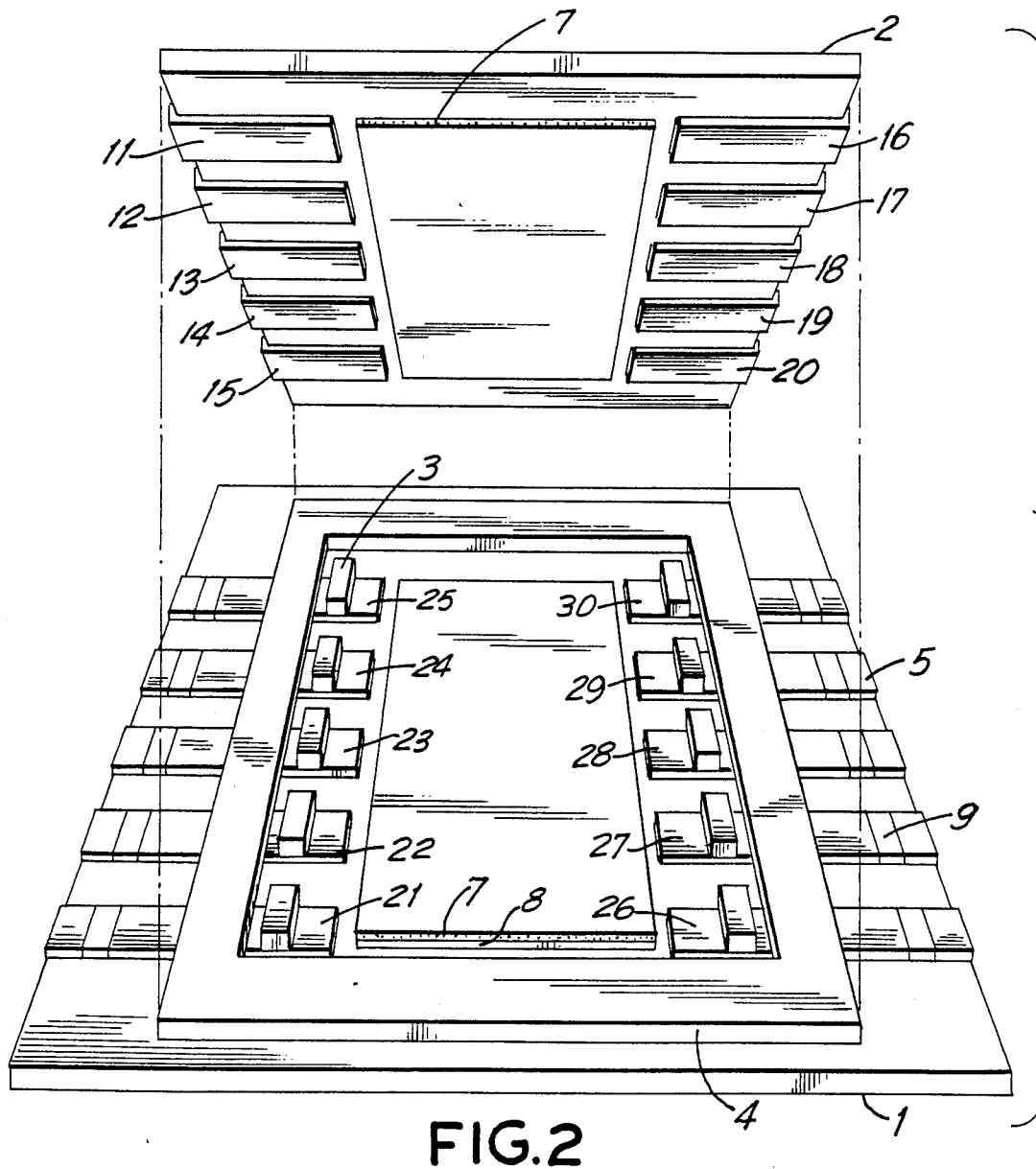
FIG. 2 is an isometric view of the arrangement shown in FIG. 1, but again with evacuation tubing omitted for clarity.

The bottom substrate 1 and top substrate 2 are separated by a distance d. A plurality of conductively coated spacers 3 (best seen in FIG. 2) and a dielectric seal 4 (also best seen in FIG. 2) maintain the appropriate separation between the substrates 1 and 2. The spacers 3 are preferably coated with a thick-film of silver; however, it will be recognized that other conductors could be used. As seen in FIG. 2, the dielectric seal 4 extends all the way around the central display area of the lamp 100 while the spacers 3 consist of ten separate electrically conductive pads arranged in groups of five along the left and right edges of the dielectric seal 4.

As will be discussed in greater detail in connection with a discussion of FIG. 2, the spacers 3 electrically connect a plurality of thick-film conductors 11–20 (FIG. 2) of the top substrate 2 and a plurality of aligned thick-film conductors 21–30 (FIG. 2) of the bottom substrate 1 to form a plurality of pairs of split hollow electrodes 10 between which a more uniform electric discharge can take place. Each of the split hollow electrodes 10 has a thick-film resistor 9 electrically connected to it to control its current.

Upon assembly, the dielectric seal 4 in conjunction with a thick-film silver forms a vacuum tight seal between the top and bottom substrates 1 and 2. Thick-film silver also serves as the basic electrode material of the electrodes 10. The lamp 100 also includes a thick-film phosphor layer 7 on each of the substrates 1 and 2. The phosphor layer 7 on the bottom substrate 1 is preferably deposited on top of the reflective layer 8 previously discussed.

Further details of the preferred method of construction of lamp 100 are described below. First, a thick-film of silver is printed on the substrates 1 and 2 to form the conductors 11-30. This thick-film of silver is dried and heat-treated at approximately 540 degrees celsius (C) for 18 minutes. Next, the thick-film resistors 9 are printed and dried. Then, the edge silver areas 5 are printed and dried. Next, spacer rods are coated with a dielectric material and placed on the heat-treated silver conductors 21-30 on the bottom substrate 1 forming a frame 4 around the central display area of lamp 100. The spacers 3 are conductively coated with silver and are also placed on the conductors 21-30 on the bottom substrate 1. Then the bottom substrate 1 and the edge silver areas 5, the thick-film resistors 9, the dielectric coated spacer rods, and the spacers 3 are all co-fired at 450 degrees C for 18 minutes. The aluminum layer 8 is vacuum-deposited on substrate 1, and the phosphor layers 7 are either settled or printed on the substrates 1 and 2 and heat-treated.

Finally, the substrates 1 and 2 are physically placed together and sealed together by heating the pre-glazed dielectric layer on the spacer rods at 450 degrees C for 27 minutes. During this last heating there is a flow of silver so that the completed lamp 100 looks approximately as shown in cross-section FIG. 1. The lamp 100 is evacuated through an evacuation tube, not shown, and filled with mercury vapor and inert gas at a predetermined low pressure. Then, the evacuation tube is sealed off.

Figure 3:
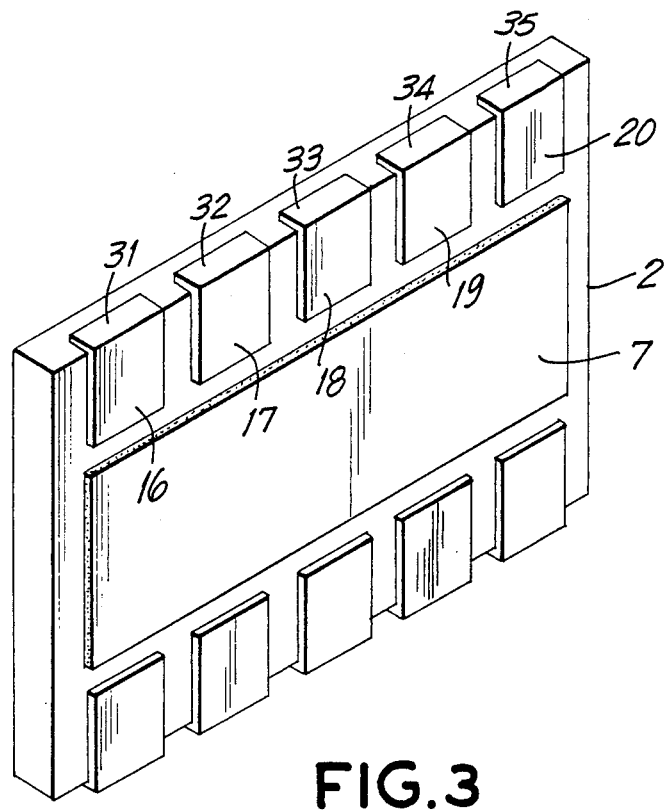
FIG. 3 is an end and side view of the inside surface of the to substrate shown in FIGS. 1 and 2.

FIGS. 2 and 3 illustrate the disposition of the spacers 3, the thick-film conductors 11-30, the plurality of thick-film resistors 9, the seal frame 4, the phosphor layer 7, and the aluminum layer 8 in a preferred embodiment of the structure of the thick-film integrated flat fluorescent lamp 100. In FIG. 2, the components of lamp 100, which are shown fully assembled in FIG. 1 are shown prior to completion of assembly to better illustrate the configuration and alignment of various elements of the lamp 100. For the purpose of creating the split hollow electrodes 10, two corresponding groups of pairs of thick-film silver conductors, 11-21, 12-22, 13-23, 14-24, 15-25, 16-26, 17-27, 18-28, 19-29, 20-30 are printed on the substrates 1 and 2. For example, as seen in FIG. 2, the conductor 11 on substrate 2 is paired with conductor 21 of substrate 1. When substrate 2 is sealed together with substrate 1, the conductor pairs are electrically connected by the plurality of electrically conductive spacers 3. In addition to electrically connecting the conductors of the top substrate 2 to the corresponding conductors of bottom substrate 1 the spacers 3 also serve to maintain a predetermined distance between the substrates.

A substantial advantage of the described arrangement of electrodes 10 is to produce more uniform brightness with long life. The resistors 9 can be constructed to be very nearly the same resistance. When so constructed, an equal branching of the electrical discharge current between the corresponding members of each group, namely 11-21 and 16-26; 12-22 and 17-27; 13-23 and 18-28; 14-24 and 19-29; 15-25 and 20-30, occurs. A further advantage of the arrangement described is the simple and economical method of screen printing to produce thick-film electrodes, thick-film resistors, and thick-film phosphors. A still further advantage of the arrangement described is the compact flat panel structure of the lamp which can be easily adapted for backlighting flat panel information display devices such as liquid crystal displays. As an alternative embodiment, the resistors 9 can be made to have gradation of different resistances as one moves away from the center, to compensate for the nonuniformity in brightness likely to exist at the sides containing no electrodes.

FIG. 3 illustrates extended portions 31, 32, 33, 34, and 35 of the thick-film conductors 16-20 of the top substrate 2. These portions and the corresponding portions for conductors 11-15 (not shown) can be externally connected to make a second electrical connection between the conductors 21-30 on the bottom substrate 1, shown in FIG. 2, to the electrodes 11-20 on the top substrate 2. This connection is illustrated in the areas 6 of FIG. 1 where it can be seen that externally painted silver has bridged the conductors on the top substrate 2 down to those on the substrate 1. This connection insures that even if the electrical connection already arranged to be made by the conductively coated spacers 3 fails, electrical connection will be made.

Figure 4:
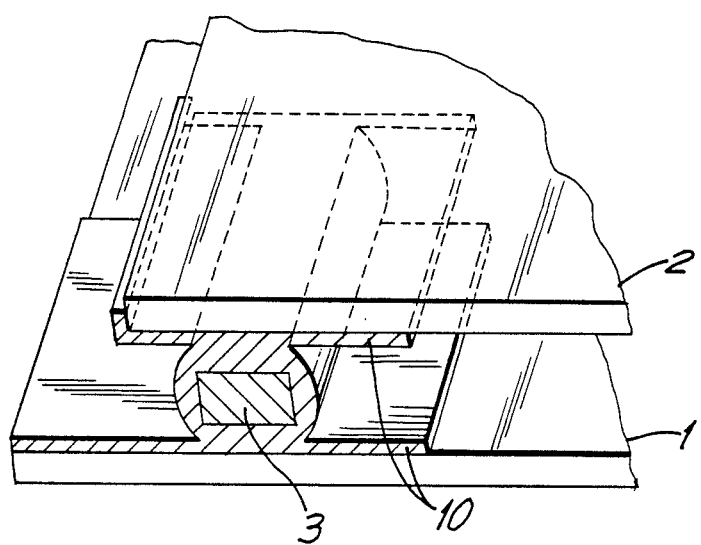
FIG. 4 is an isometric view of a single split hollow electrode formed according to the present invention.

FIG. 4 shows in detail the configuration of one of the thick-film hollow electrodes 10 formed by electrically connecting a conductor on the top substrate 2 to the thick-film conductor on the bottom substrate 1 through one of the conductively coated spacers 3. FIG. 4 shows only a single hollow electrode 10 with its neighboring elements omitted for clarity. Seal 4 is also omitted for clarity.

Figure 5:
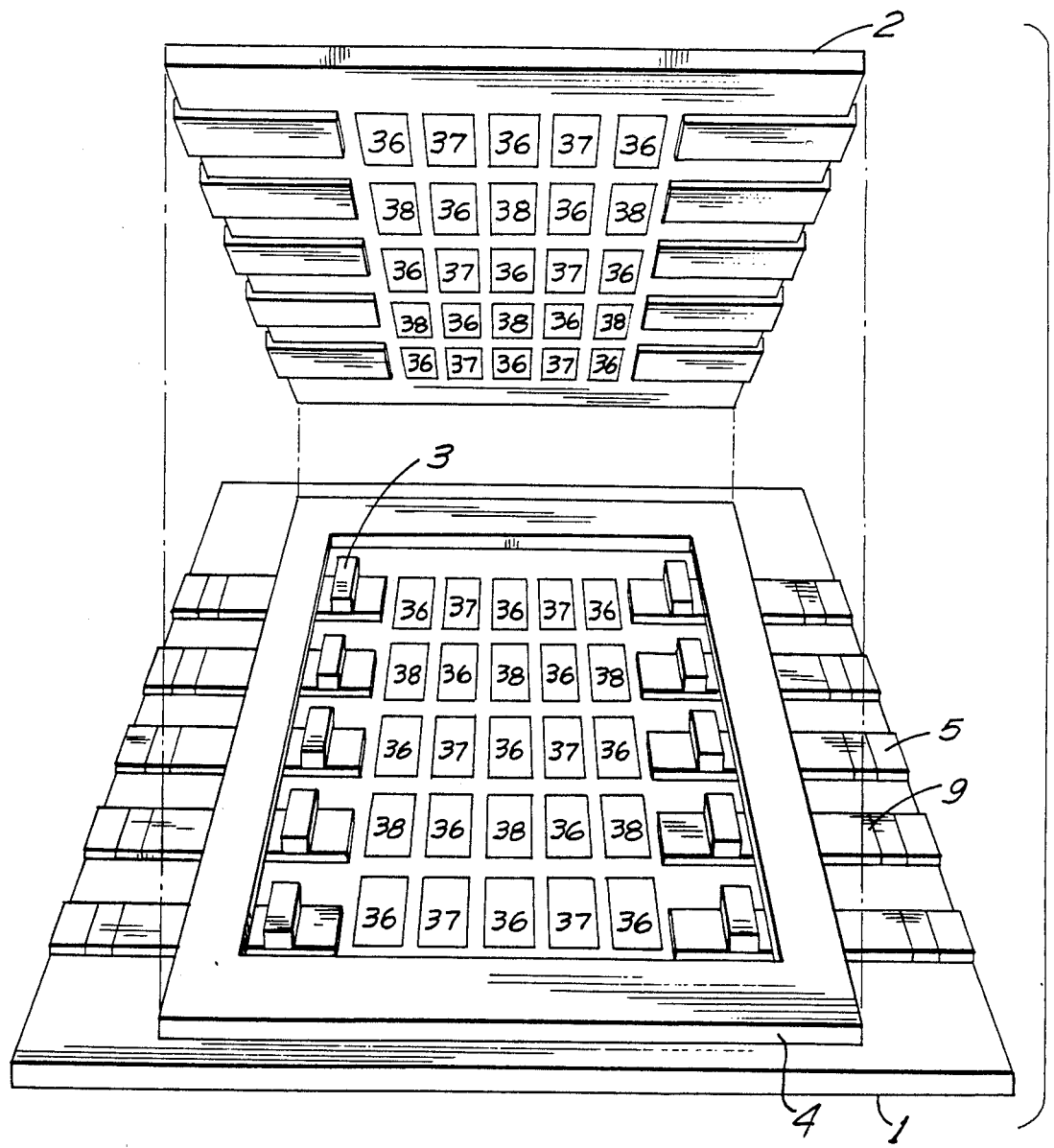
FIG. 5 is an isometric view of a mosaic of three color phosphor suitable for use in a flat fluorescent lamp according to the present invention for use in a color display.

FIG. 5 shows a mosaic structure of three different color phosphors deposited on both the top substrate 2 and bottom substrate 1. This mosaic, or one similar thereto, may be utilized in an embodiment in which a color display is desired. In FIG. 5, green phosphor is represented by the blocks 36, blue phosphor by the blocks 37, and red phosphor by the blocks 38. The blocks 36, 37 and 38 may be square, rectangular or any other desired shape. The blocks 36, 37 and 38 of green, blue and red phosphor are arranged in a fixed sequence and may be electrically scanned to create a color display. The different color phosphor blocks 36, 37 and 38 may be separated from one another by a black layer or by the bare surface of the substrates.

In a prototype of a lamp according to the present invention, thick-film split hollow electrodes were fabricated having a dimension of 9mm by 9mm with a vertical gap of approximately 1mm and a horizontal distance between the members of each group of 5mm. The phosphor coated area was 63mm by 72mm and the diagonal of the lamp 100 measured approximately 99mm. The value of the thick-film resistors used in this prototype was in the range of a few kilohms.

It will be understood that the above dimensions, as well as the above description of the present invention are susceptible to various modifications, changes, and adaptations.

By way of example, while the presently preferred embodiment calls for screen printing of thick-film conductors 11-30 out of silver paste, it should be recognized that nickel or other conductive paste or combinations of paste may be used in a single or multi-layer construction as desired. To increase efficiency further, a layer of a low work function material such as barium oxide may be coated on the inside surface of the thick-film hollow electrodes 10. The phosphor layers 7 may be screen printed, settled, sprayed, dip-or spin-coated, electrophoretically coated, sputtered or laser deposited.

We claim:

1. An improved electrode structure for a flat fluorescent lamp, said electrode structure comprising:
   a first plurality of N thick-film conductors arranged in two groups of N/2 first substrate conductors arranged one group on each edge of a first substrate;

a second plurality of N thick-film conductors arranged in two groups of N/2 second substrate conductors arranged one group on each edge of a second substrate;

said two groups of N/2 first substrate conductors and said two groups of N/2 second substrate conductors being located on their respective substrates so as to be substantially in alignment; and a plurality of N spacers having an electrically conductive outer surface, one of each of said plurality of N spacers being sandwiched between each one of the first plurality of N thick-film conductors and one of the second plurality of N thick-film conductors in order to form two groups of N/2 split hollow electrodes.

2. The electrode structure of claim 1, further comprising a plurality of N thick-film resistors, one of said plurality of N thick-film resistors being electrically connected to each one of the split hollow electrodes in said two groups of N/2 split hollow electrodes.

3. The electrode structure of claim 1, further comprising a plurality of N edge thick-film conductors electrically connected one each to each one of the plurality of N thick-film resistors.

4. A method of making an improved electrode structure for a flat fluorescent lamp, said method comprising the following steps:

laying down a first plurality of N thick-film conductors arranged in two groups of N/2 first substrate conductors arranged one group on each edge of a first substrate;

laying down a second plurality of N thick-film conductors arranged in two groups of N/2 second substrate conductors arranged one group on each edge of a second substrate, said two groups of N/2 first substrate conductors and said two groups of N/2 second substrate conductors being located on their respective substrates so as to be substantially in alignment; and sandwiching a plurality of N spacers having an electrically conductive outer surface, one of each of said plurality of N spacers between each one of the first plurality of N thick-film conductors and one of the second plurality of N thick-film conductors in order to form two groups of N/2 split hollow electrodes.

5. The method of claim 4, wherein the step of laying down a first plurality of N thick-film conductors comprises the substeps of printing a thick-film of silver to form said conductors, and drying and heat treating said thick-film of silver.

6. The method of claim 5, wherein the drying and heat treating is done at approximately 540 degrees celsius for approximately 18 minutes.

7. The method of claim 4, further comprising the step of forming and connecting a thick-film resistor to each of the split hollow electrodes in said two groups of N/2 split hollow electrodes.

8. The method of claim 7, wherein each of said thick-film resistors is formed by printing and drying said resistors on the first substrate.

9. A method of constructing a thick-film integrated flat fluorescent lamp with a central display area, comprising the following steps:

printing a first plurality of thick-film silver conductors on each of two substrates to form a plurality of N conductors on each substrate;

drying and heat-treating said first plurality of thick-film silver conductors;

printing a plurality of N thick-film resistors on a first of said two substrates;

printing a plurality of N edge silver areas on the first of said two substrates;

placing dielectric coated spacer rods on the plurality of heat-treated conductors on the first substrate forming a frame around the central display area of said lamp;

placing a plurality of N conductively coated spacers on the plurality of heat-treated conductors on the first substrate;

cofiring the first substrate;

depositing a phosphor layer on each of the two substrates;

placing the two substrates together and sealing them together by heating;

evacuating the sealed central display area; and filling the sealed central display area with a mixture of mercury vapor and inert gas.

10. An improved thick-film integrated flat fluorescent lamp with a central display area, comprising:

two groups of a plurality of thick-film hollow electrodes located one group on each edge of the central display area;

two substrates, a first of said substrates having a phosphor layer;

a dielectric coated seal forming a frame around the central display area and sealing the central display area; and a mixture of mercury vapor and inert gas sealed within the central display area.

11. The flat fluorescent lamp of claim 10 wherein the second of said substrates has a layer of reflective material and a phosphor layer.

12. The flat fluorescent lamp of claim 10 further comprising a plurality of thick-film resistors, each of said plurality of thick-film hollow electrodes being electrically connected to one of said plurality of thick-film resistors.

13. The flat fluorescent lamp of claim 12 wherein each of said plurality of thick-film resistors is electrically connected to one of a plurality of thick-film conductors.

14. The flat fluorescent lamp of claim 10 wherein the phosphor layer of the first substrate comprises a mosaic of blocks of red, blue and green phosphor.

* * * * *